July 15, 1924.
C. F. DIENSTBACH ET AL
1,501,650
SANDING DEVICE FOR AUTOMOBILES
Filed Jan. 9, 1922
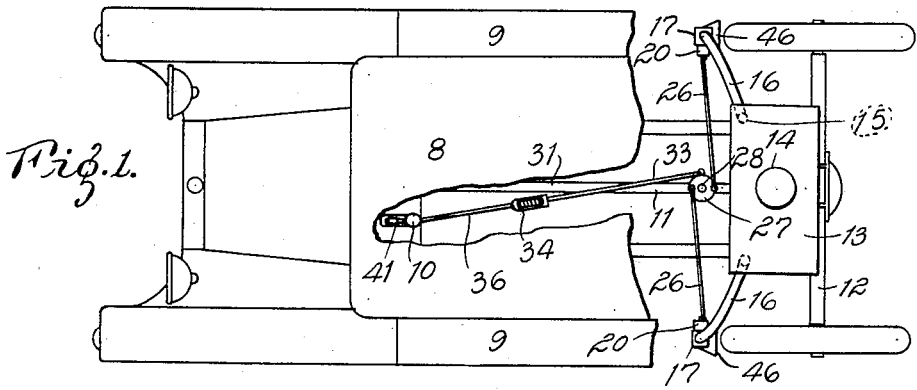
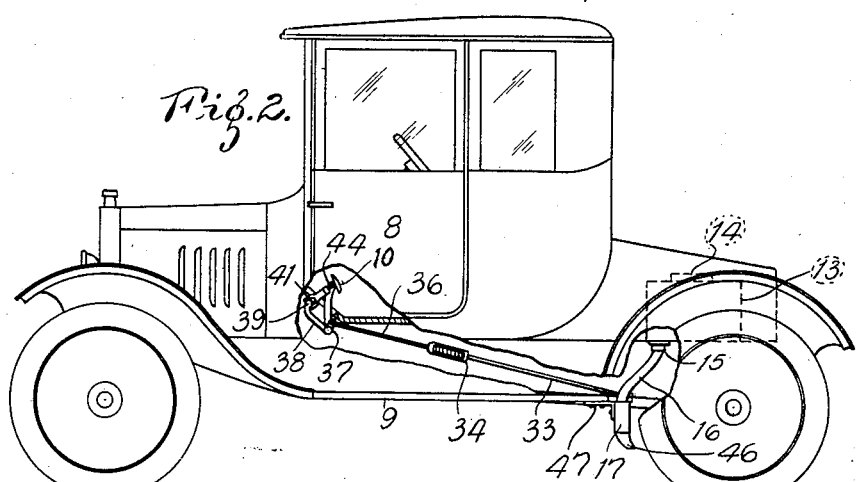
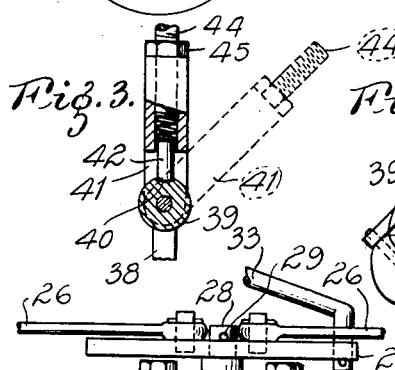
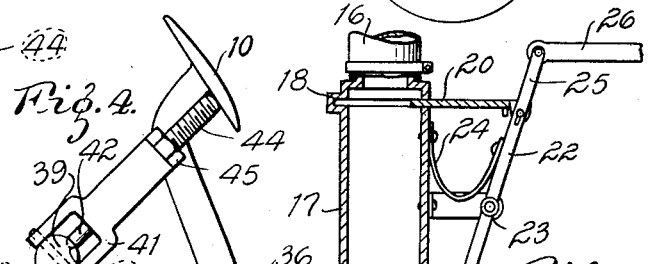
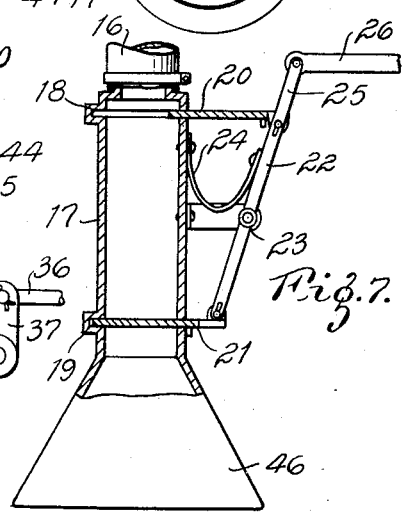
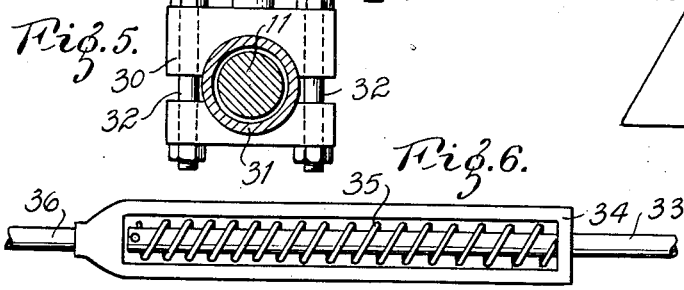
Inventors:
Charles F. Dienstbach,
Joseph W. Kuemmerle.
By Edward E. Longan
Attorney.

Patented July 15, 1924.

1,501,650

UNITED STATES PATENT OFFICE.

CHARLES F. DIENSTBACH AND JOSEPH W. KUEMMERLE, OF ST. LOUIS, MISSOURI.

SANDING DEVICE FOR AUTOMOBILES.

Application filed January 9, 1922. Serial No. 527,959.

*To all whom it may concern:*

Be it known that we, CHARLES F. DIENSTBACH and JOSEPH W. KUEMMERLE, citizens of the United States, and residents of the city of St. Louis and State of Missouri, have invented certain new and useful Improvements in Sanding Devices for Automobiles, of which the following is a specification containing a full, clear, and exact description, reference being had to the accompanying drawings, forming a part hereof.

Our invention relates to improvements in sanding devices for automobiles, and has for its primary object a device which will drop measured quantities of sand before the traction wheels of an automobile.

A further object is to construct a sanding device for automobiles which is so arranged that it can be thrown in and out of operative position, the device being adapted to be manipulated by action of the brake pedal.

A still further object is to construct a sanding device for automobiles intended to be used when the streets are wet and slippery, both in giving the wheels traction and also to prevent skidding when applying the brakes.

In the drawings,

Fig. 1 is a top plan view of our device attached to a motor vehicle, parts thereof being broken away.

Fig. 2 a side elevation of the same with parts broken away.

Fig. 3 a vertical fragmental section of the operating lever made use of.

Fig. 4 a fragmental side elevation of the operating lever and brake lever.

Fig. 5 an enlarged fragmental view of the swivel plate and its connections, showing the manner of mounting the same on the propeller shaft housing.

Fig. 6 a fragmental view of the flexible connection between the operating lever and swivel plate.

Fig. 7 a side elevation of the valve mechanism and distributing chute, with parts broken away and in section.

In the construction of our device we employ an automobile 8, which is provided with the usual running boards 9, brake pedal 10, propeller shaft 11, and chassis 12. Located in the body of the automobile, or secured to the chassis, is a container 13 in which the sifter and dry sand is placed through an opening which is closed by the cap 14. Secured in the bottom of the container 13 are nipples 15. These nipples are placed as near the side walls of the container as is found practical. Secured to the nipples is a flexible tubing 16, which in turn is secured to the valve mechanism and distributing chute. This valve mechanism and distributing chute consists of a tubular portion 17, which is provided with slide ways 18 and 19, in which slides or valves 20 and 21 are mounted. These slides or valves are attached to a lever 22, which is pivotally mounted at the point 23. This point being midway between the valves 20 and 21, so that both will have an equal amount of movement, but in opposite directions. The valves are normally held in the position indicated in Fig. 7, by means of a spring 24. To the end 25 of the lever 22 is attached one end of a connecting bar 26, its opposite end being pivotally mounted on a swivel plate 27. This swivel plate is in turn pivotally mounted on a stud 28, where it is held by means of a cotter key 29.

We may, however, if found desirable, use other means for securing the swivel plate 27 on the stud 28. The stud 28 is secured to a shackle 30, which shackle is in turn secured to the propeller shaft housing 31, by means of bolts 32. Pivotally secured to the swivel plate 27 is a connecting rod 33, its forward end projecting through a yoke 34. This forward end is encircled with a coil spring 35. The yoke 34 is in turn secured to a connecting rod 36. Its forward end being pivotally connected to the arm 37 of the operating lever 38. The operating lever 38 is provided on its end with a ball 39, which ball is provided with a depression 40. Pivotally secured to the ball is a fork 41, which is provided with a spring actuated plunger 42, so that when the yoke is moved in the position shown in Figs. 3 and 4, the pin will engage with the depression, and hold the fork against accidental shifting, but at the same time permit the fork to be laid over so that it will be out of line with the brake pedal 10. The upper end of the fork 41 is screw threaded to receive a screw threaded rod 44. This is for the purpose of adjustment so that the operating lever 38 can be depressed as soon as the brake pedal is depressed, or it can be so arranged as to operate only after the brake pedal has been depressed a certain distance. In order to secure the rod 44 in adjusted position a lock nut 45 is employed. The lower end of the valve mechanism and distributing chute is fan shaped, as indicated by the numeral 46, (see Fig. 7) and is for the purpose of distributing a thin, wide stream, one which is preferably slightly wider than the tire on the traction wheel.

The operation of our device is as follows:

After the device has been properly installed, the fork 41 can be folded down against the toe board of the automobile, and when the brake pedal is operated, no sand will be discharged. In the event it is desired to use sand, the yoke 41 is swung into the position indicated in Fig. 4, causing the pawl 42 to engage with the depression 40 in the ball 39. Then on depressing the brake pedal, the operating lever 38 is also depressed and exerts a forward pull on the rod 36. This forward pull is in turn communicated to the rod 33, which rod turns the swivel plate 27, and this in turn causes a movement of the connecting rods 26. This movement swings the lever 22 on the pivot 23, and closes the valve 20, while simultaneously opening the valve 21. In the event that the moving of the brake pedal transmits a greater pull on the rods 36 and 33 than is necessary to operate the valves 20 and 21, the spring 35 is compressed. This spring has a rather light tension so that a great amount of pressure will not be exerted on the valve mechanism. This operation closes off the distributing chute at its upper end, and allows the sand accumulated above the valve 21 to drop in front of the traction wheels.

We may also if found desirable, operate the brake pedal only partially, so that the valves 20 and 21 will not be opened or closed entirely. This will allow a steady stream of sand to trickle in front of the traction wheels, and give a grip on slippery pavements, where it would otherwise be impossible to get traction.

It will be noted from Fig. 2 that the distributing chutes and valve mechanism are secured to the running board by means of brackets 47.

We may, however, employ other means for securing the distributing chutes, or they may be secured at other places without departing from the spirit of our invention.

It is also a well known fact that various automobiles, especially motor trucks, do not have their propeller shaft enclosed in a housing. When this is the case, the swivel plate 27 is reversed or turned upside down and secured to the body of the automobile. This, however, does not depart from the principle of our invention, nor does it alter this operation, with the one exception, that the position of the rods 26 will be reversed, as shown in Fig. 1.

Having fully described our invention, what we claim is:

1. In a sanding device for automobiles in combination with the braking mechanism thereof, a sand reservoir, pipes leading from said reservoir and each terminating in a vertical chamber having a flattened discharge orifice, a pair of valves vertically spaced apart located in said chamber, a lever mechanism located on the outside of said chamber and adapted to operate said valves in opposite directions simultaneously, and a resilient connection between the lever mechanism and the braking mechanism for operating said valves.

2. In a sanding device for automobiles, the combination with the braking mechanism thereof and a sand reservoir having a discharge outlet in front of each of the rear wheels, of a pair of vertically spaced apart valves located adjacent each discharge outlet, a lever mechanism for operating the valves of each pair in opposite directions simultaneously, a swivel plate, connecting bars secured to said swivel plate and said lever mechanism for operating the same, and means for connecting the swivel plate and braking mechanism, whereby said plate may be rotated, and a measured quantity of sand discharged.

3. The sanding device of claim 2 in which means are provided whereby the device may be placed in and out of operation as desired.

4. The sanding device of claim 1 in which means are provided whereby the device may be placed in and out of operation as desired.

In testimony whereof, we have signed our names to this specification.

CHARLES F. DIENSTBACH.
JOSEPH W. KUEMMERLE.